(12) United States Patent (10) Patent No.: US 8,911,526 B2
Farrukh et al. (45) Date of Patent: Dec. 16, 2014

(54) NANO-LEUCITE FOR SLOW RELEASE NITROGEN FERTILIZER AND GREEN ENVIRONMENT

(71) Applicants: Muhammad Akhyar Farrukh, LaHore (PK); Fizza Naseem, Lahore (PK)

(72) Inventors: Muhammad Akhyar Farrukh, LaHore (PK); Fizza Naseem, Lahore (PK)

( * ) Notice: Subject to any disclaimer, the term of this patent is extended or adjusted under 35 U.S.C. 154(b) by 121 days.

(21) Appl. No.: 13/738,727

(22) Filed: Jan. 10, 2013

(65) Prior Publication Data

US 2014/0190226 A1    Jul. 10, 2014

(51) Int. Cl.
| | |
|---|---|
| *C05C 7/00* | (2006.01) |
| *C05C 1/02* | (2006.01) |
| *C05C 3/00* | (2006.01) |
| *C05D 9/00* | (2006.01) |
| *A01N 25/00* | (2006.01) |

(52) U.S. Cl.
CPC ........................................ *C05C 1/02* (2013.01)
USPC ............ 71/61; 71/57; 71/59; 71/62; 71/64.01

(58) Field of Classification Search
CPC ....................................................... C05C 1/02
USPC ..................... 71/57, 59, 61, 62, 64.01–64.13; 977/773–787
See application file for complete search history.

(56) References Cited

PUBLICATIONS

Park et al., Journal of Control Release, 106, 44-50 (2005).
Kottegoda et al., Current Science, 101,73-78 (2011).
Tomaszewska et al., J. Agric. Food Chem, 50, 4634-4639 (2002).
Piche et al., Journal of Biomedical Materials Research, 28, 603-609 (1994) 1.
Chen et al., Journal of. Dental Research, 89, 1510-1516 (2010).
Park et al., Microporous and Mesoporous Materials, 50, 91-99 (2001).
Adnan et al., J. Chin. Chem. Soc., 57:2, 222-229 (2010).
Farrukh et al., Turk. J. Chem., 34:4, 537-550 (2010).
Goh et al., Turk. J. Chem., 35:3, 375-391 (2011).
Saron et al., Appl. Surf. Sci., 258:13, 5200-5205 (2012).
Yazid et al., Turk. J. Chem., 34:4,639-650 (2010).
Bhardwaj et al., Use of Surface Modified Inorganic Nano Materials as Slow Release Nitrogen Fertilizer, Springer Science, pp. 171-173 (2011).

*Primary Examiner* — Jennifer A Smith
(74) *Attorney, Agent, or Firm* — Sarfaraz K. Niazi (57) ABSTRACT

To compete with the increasing global food demand, it is necessary to increase the food production. Fertilizers which are in practice now a days has major disadvantage that 50% of nutrient contents loss due to leaching and also leads to ground water contamination. Slow release nitrogenous fertilizers are good in this regard in that they have minimum nutrient loss due to leaching. Potassium aluminum silicate (Leucite) nanoparticles occluded by calcium ammonium nitrates are slow release fertilizers and are synthesized by hydrothermal method. Its application as slow released nitrates fertilizers was determined by observing nitrate release for 16 days.

2 Claims, 8 Drawing Sheets

NANO-LEUCITE FOR SLOW RELEASE NITROGEN FERTILIZER AND GREEN ENVIRONMENT

BACKGROUND OF THE INVENTION

Leucite is the material having the composition of potassium aluminium silicates with the formula of $K[AlSi_2O_6]$. While zeolites are the aluminium silicates with wide variety of cations like $Na^+$, $K^+$, $Ca^{2+}$, $Mg^{2+}$, having formula of $Na_2Al_2Si_3O_{10}\cdot 2H_2O$ (an example of zeolite). Nanotechnology deals with materials smaller than 100 nanometers with novel properties. Scientists have worked on the synthesis of zeolites and leocite and studied their applications [1-7]. There are several methods to synthesis the nanomaterials like, sol-gel [8], hydrothermal[9], conventional heating[9], anodization[10], wet oxidation[11] and deposition-precipitation[12] methods. The data have been reported on the synthesis of zeolites and their application in agriculture and slow release nitrogen fertilizers [2,3,7]. The focus of this research is to synthesis the leucite nanoparticles with cost effective method and their applications in slow release nitrogen fertilizers to make the green environment.

Slow release nitrogen fertilizers are needed to meet the demand of food which is increasing in the globe due to increasing population. It is also essential to over the come the percentage of yield losses due to weeds and pests by applying appropriate pesticides or fertilizers having long life efficiency. Fertilizers are the main source of nutrients, but when these fertilizers are applied to soil, only small portion is utilized while the remaining portion is subjected to degradation and leaching which cause ground water contamination and lead to health problems. The nitrogen applied to the soil through conventional fertilizers having particle size dimensions greater than 100 nm and 50-70% of them is lost due to leaching. Due to leaching, Nitrogen Utilization Efficiency (NUE) by the plants decreases. Increase in nitrogen content in the surface water leads to the algae proliferation which contaminate water and decrease its storage capacity. It is perhaps less effective way to increase the NUE of the plants by conventional fertilizer. Nanofertilizers are expected to be more better than conventional fertilizers due to high surface area to volume ratio. Nanofertilizers increase the retention of nutrient in the soil through the extent of the sorption which is controlled by physical and chemical properties of the fertilizer and soil.

Aluminosilicates could be best eco-friendly materials. They can exert beneficial effects to the land and can solve many problems related to the agricultural and water pollution. They have excellent cation exchange capacity (CEC) and their nutrient holding capacity can be increased by salt occlusion. Their potential application has been explored as selective adsorbents, artificial soil and fertilizer matrices. The purpose of this invention to synthesis nanolecuite porous material by hydrothermal method in anionic surfactant (sodium dodecyl sulfate). The surfactant was used to increase the porosity of the nanoleucite. When this porous material is treated with molten salts, the salt could be introduced into the pores. Salts are occluded depending upon the proper size of pore and each ion pair. It is also observed that occluded salt is somewhat stable to water washing.

BRIEF SUMMARY OF THE INVENTION

The zeolites used in previously reported methods for the applications of slow release fertilizers are expensive and their synthesis is time consuming. Aluminosilicates are well known for their use as fertilizers because they have very good cationic exchange ability. They have well known cation selectivity and have a specific type of micro porosity. Many attempts have been done to obtain slow release zeolite based fertilizers. Potassium aluminium silicates have two kinds of nutrient sources, occluded salts and exchangeable cations. In this study the emphasis is on release kinetics of $NO_3^-$ ion from potassium aluminium silicate nanoparticles occluded calcium ammonium nitrate (CAN). Nanoparticles of potassium aluminium silicate were synthesized through hydrothermal method and anionic surfactant is used to make the material porous. For characterization thermogravimetric analysis is employed and FTIR is used for the determination of nitrate release. Morphology and particle size was calculated by transmission electron microscope (TEM) and x-ray diffraction (XRD) techniques. The purpose of this invention is synthesis the porous leucite at nanoscale and to replace the polymeric fertilizer [4] and zeolites [7] with nanolecucite for their application in the slow release nitrogen fertilizer.

DETAILED DESCRIPTION OF THE INVENTION

Figure 1:
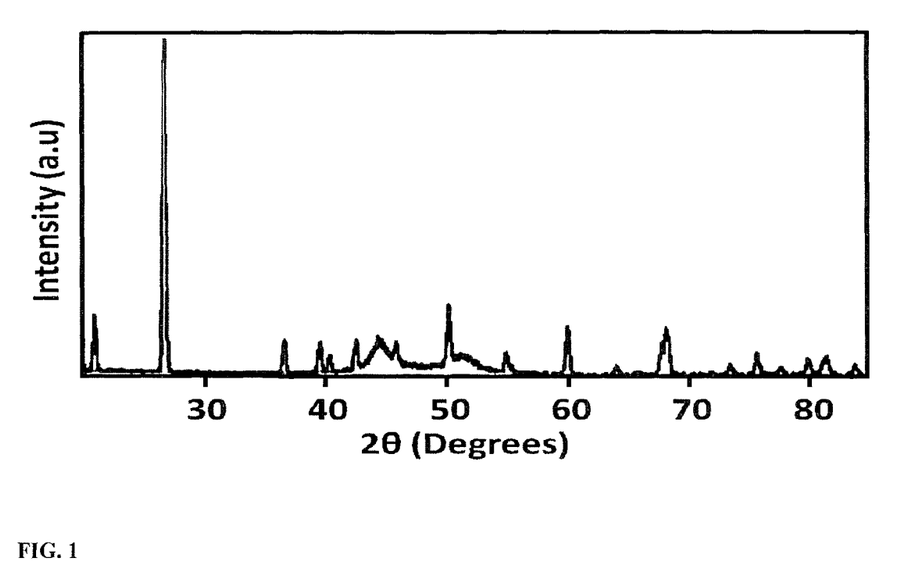
FIG. 1: XRD pattern of nanoleucite in the presence of surfactant.

Characterization of nanoleucite samples were done with different techniques as explained below Powder X-Ray Diffraction For powder x-ray diffraction, dry powder of nanoleucite was used. The XRD data for the samples which were obtained through surfactant assisted synthesis showed the particle size at nanoscale determined through Scherrer's equation [9]. XRD pattern in the FIG. 1. was recorded in the region of 2θ from the value of 20 to 80°. The peaks due to leucite were located at 2θ values of 26.607, 36.582, 42.526, 45.845, and 65.852 for the reflection planes (004), (521), (620), (631), (851), (844) respectively. The XRD result is shown in Table 1.

TABLE 1

Table For XRD Data Of The Sample

| 2 θ (exp) | 2 θ reported | hkl reflection | Sample composition |
|---|---|---|---|
| 26.607 | 26.527 | 004 | Leucite $KAlSi_2O_6$ |
| 36.582 | 36.620 | 521 | Leucite $KAlSi_2O_6$ |
| 39.516 | 39.516 | 0-42 | Microcline $KAlSi_3O_8$ |
| 40.316 | 40.339 | -2-23 | Microcline $KAlSi_3O_8$ |
| 42.526 | 42.539 | 620 | Leucite $KAlSi_2O_6$ |
| 44.297 | 44.298 | 061 | Microcline $KAlSi_3O_8$ |
| 45.845 | 45.786 | 631 | Microcline $KAlSi_3O_8$ |
| 50.146 | 50.028 | -350 | Microcline $KAlSi_3O_8$ |
| 54.861 | 54.626 | 800 | Leucite $KAlSi_2O_6$ |
| 60.047 | 60.870 | 752 | Leucite $KAlSi_2O_6$ |

TABLE 1-continued

Table For XRD Data Of The Sample

| 2 θ (exp) | 2 θ reported | hkl reflection | Sample composition |
|---|---|---|---|
| 64.067 | 64.269 | 761 | Leucite $KAlSi_2O_6$ |
| 65.852 | 65.931 | 851 | Leucite $KAlSi_2O_6$ |
| 68.356 | 68.386 | 844 | Leucite $KAlSi_2O_6$ |

Thermogravimetric Analysis of the Leucite Sample

Figure 2:
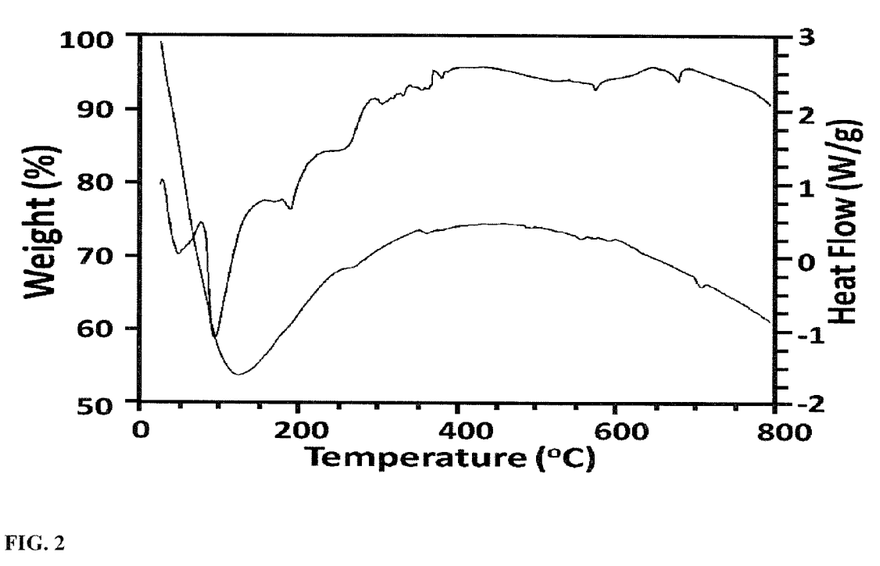
FIG. 2: TGA plot nanoleucite showing the percentage of weight loss with temperature

Thermogravimetric data for the uncalcined leucite prepared for the occlusion of fertilizers is shown in the FIG. 2. The peak at 100-120 Celsius is for the removal of water molecules. At first the removal of adsorbed water molecules take place and then the removal of trapped water molecules take place. It is predicted that this sample is porous due to removal of trapped water molecules.

Fourier Transform Infrared Spectroscopy

The ion release in presence of water was observed in static condition. 1 gram of occluded sample was immersed in 10 mL of water. Initially the solution was filtered after 1 hour and after that after 24 hours. The released ions are determined through semi quantitative method using nitrate test strips by dipping it into the solution for 1 second, drying it and concentration of ions were measured by analyzing the color. Fourier transform infrared (FTIR) spectroscopy was also employed for the determination of nitrates. For FTIR analysis the sample was grinded with KBr in the ratio of 1:5. Using press pellet maker, pellets of this grinded sample was prepared. This pellet was placed in FTIR and its spectrum was recorded. Sample was analyzed before and after occlusion of CAN and after 14 days of nitrate released. Peak of nitrates at 1390 $cm^{-1}$ was observed. For this purpose FTIR MIDAC M2000 was used.

Transmission Electron Microscopy

Figure 3:
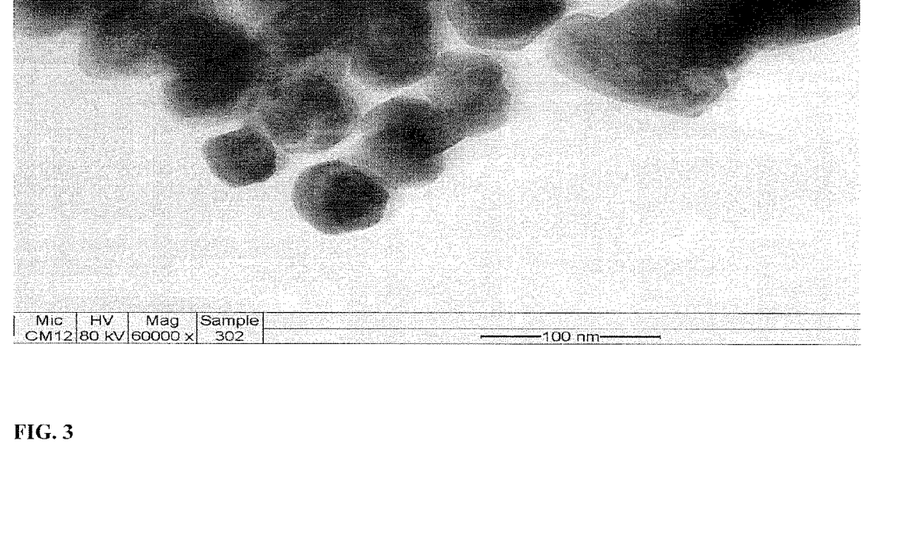
FIG. 3: TEM micrograph of the nanoleucite sample with 100 nm scale
Figure 4:
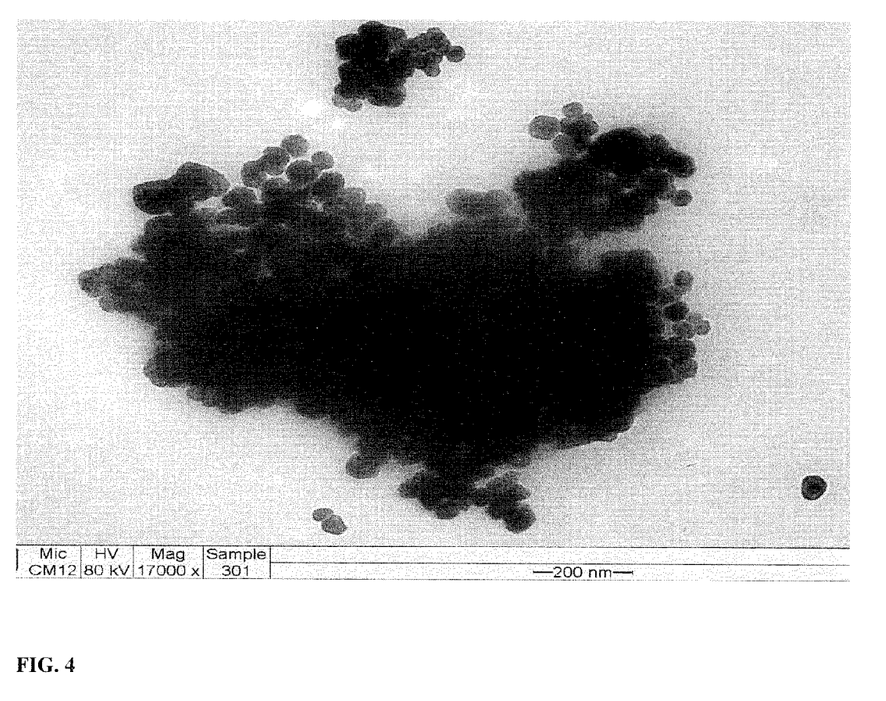
FIG. 4: TEM micrograph of the nanoleucite sample with 200 nm scale

TEM results of leucite sample are shown in FIGS. 3 and 4 and the particle size calculated from these results is 45 nm. TEM results are collected at different scales 50, 100 and 200 nm. The results are showing actual shape of nanoparticles of leucite sample.

Figure 5:
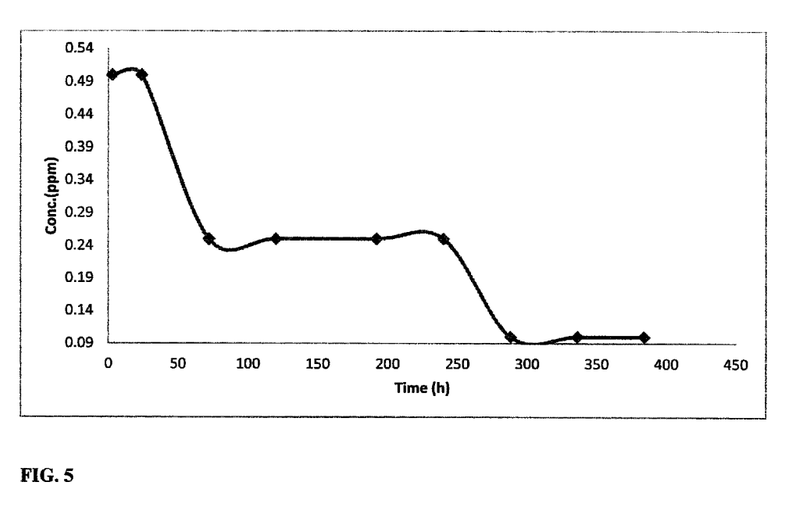
FIG. 5: Graph showing release of nitrates with interval of time

Nitrate release in water is observed for 16 days. Initially high release of nitrate ion is observed due to removal of upper coating. Due to initial burst, the concentrations of nitrate ion $NO_3^-$ in $1^{st}$ hour 25 ppm and in $2^{nd}$ hour 12.5 ppm was observed. After that the release of trapped nitrates gets started but their release was much slow. The slow release concentrations are shown in Table 2 and its plot is given in FIG. 5.

TABLE 2

Release Of Nitrates With Respect To Time

| | Time (h) | | | | | | | |
|---|---|---|---|---|---|---|---|---|
| 3 | 24 | 72 | 120 | 192 | 240 | 288 | 336 | 384 |

Conc. (ppm) 0.5 0.5 0.25 0.25 0.25 0.25 0.1 0.1 0.1

Figure 6:
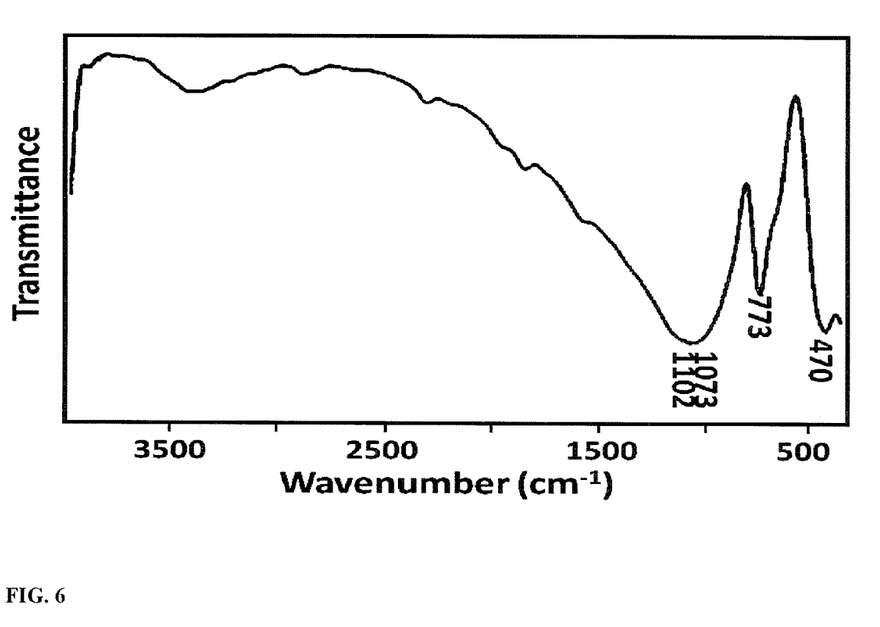
FIG. 6: FTIR spectra of nanoleucite

Fourier transform infrared spectra were taken for the determination of occlusion of calcium ammonium nitrate on the nanoleucite nanoparticles. FIG. 6 is showing the FTIR of nanoleucite ($KAlSi_2O_6$).

Figure 7:
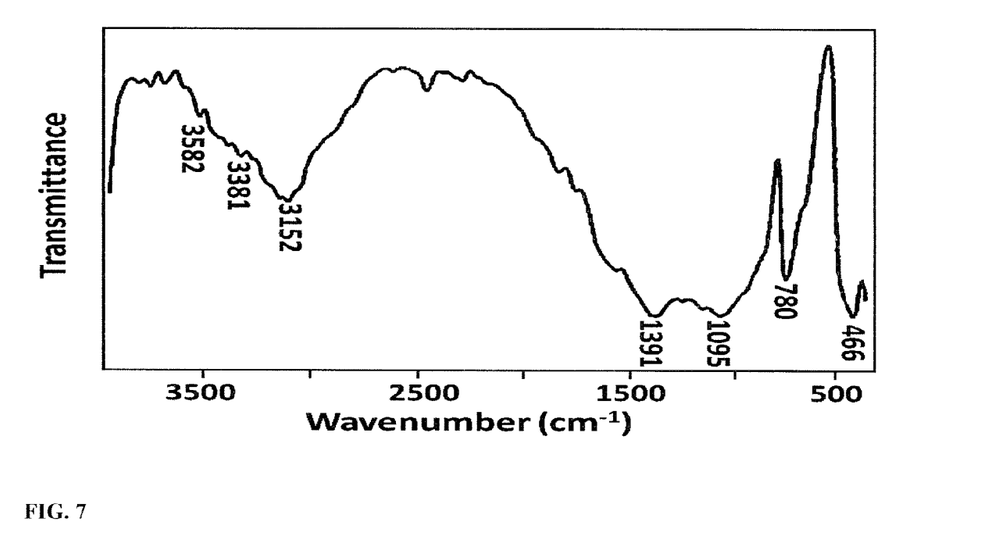
FIG. 7: FTIR spectra of calcium ammonium nitrate occluded sample.

The pore opening vibrations of $Al_2O_3/SiO_2$ are 1150-1050 $cm^{-1}$, while the $SiO_4$ symmetrical stretch at 470 $cm^{-1}$ and asymmetric stretch at 773 $cm^{-1}$. The FTIR spectra of fertilizer occluded $KAlSi_3O_8$ is shown in the FIG. 7. The peak at 1391 $cm^{-1}$ is for the nitrate.

Figure 8:
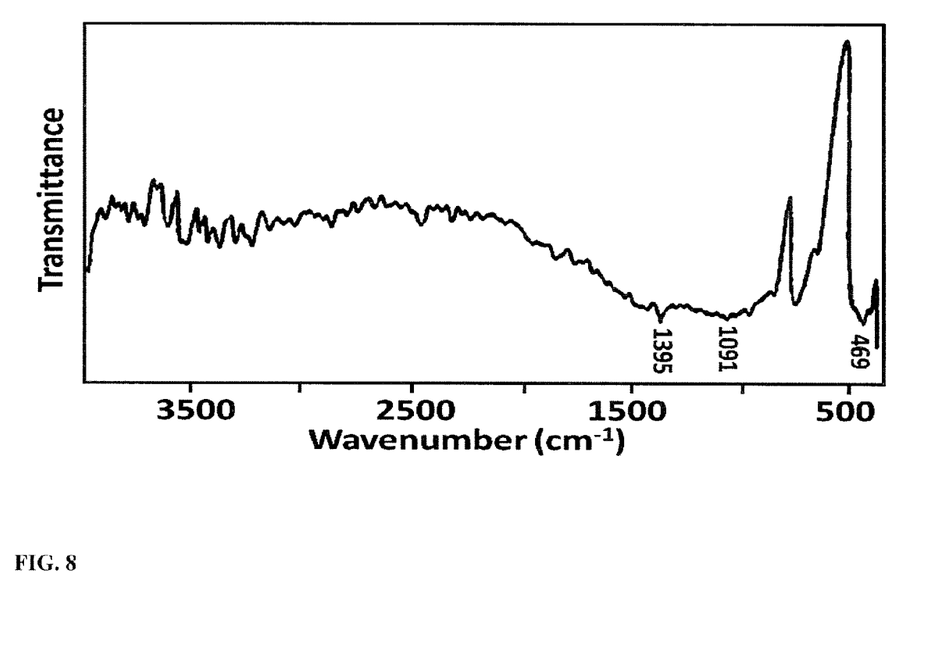
FIG. 8: FTIR of calcium ammonium nitrate occluded nanoleucite after 14 days.

The FTIR spectra taken after 14 days showing distorted peak at 1391 $cm^{-1}$ which is showing low nitrate content in the sample. IR spectra after 14 days is shown in FIG. 8.

What is claimed is:

1. A method for preparing a nanoparticle potassium aluminum silicate and occluding its inner structure with calcium ammonium nitrate to provide a sustained release fertilizer, such method comprising:
   a. making a solution consisting of 0.7 to 0.8% sodium dodecyl sulfate, 16.67% of potassium hydroxide and 0.7 to 0.8% aluminum chloride and thoroughly mixing the contents for 10-15 minutes;
   b. adding a sufficient quantity of silica to the solution in step (a) such that the final concentration of silica is 7 to 8%;
   c. stirring the mixture from step (b) for another 20-30 minutes;
   d. autoclaving the mixture from step (c) at 180° C. for four hours;
   e. cooling the autoclaved mixture from step (d) and filtering through a filter;
   f. washing the filtrate from step (e) with methanol until pH of the filtrate becomes neutral;
   g. washing the filtrate from step (f) with distilled water three times;
   h. calcining the product from step (g) at 550° C. for three hours;
   i. combining one part of the product from step (h) with 4 parts of ground calcium ammonium nitrate in an alumina crucible;
   j. heating the crucible to 160° C. to 180° C. for four hours;
   k. cooling down the crucible and transferring the product from step (j) to a centrifuge;
   l. washing the product from step (k) with water in the centrifuge operating between 10,000 to 15,000 rpm for 1 minute and repeating the process five times; and
   m. air-drying the product from step (l), wherein the product is a sustained release fertilizer.

2. The method of claim 1, wherein the sustained release fertilizer releases nitrogen for at least 16 days continuously in the presence of water.

* * * * *